(12) United States Patent
Svilans

(10) Patent No.: US 9,291,776 B2
(45) Date of Patent: Mar. 22, 2016

(54) APPARATUS AND METHOD FOR DIFFERENTIAL THERMAL OPTICAL SWITCH CONTROL

(71) Applicant: Huawei Technologies Co., Ltd., Shenzhen (CN)

(72) Inventor: Mikelis Svilans, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/092,725

(22) Filed: Nov. 27, 2013

(65) Prior Publication Data

US 2015/0147026 A1 May 28, 2015

(51) Int. Cl.
*G02B 6/35* (2006.01)
*G02B 6/42* (2006.01)

(52) U.S. Cl.
CPC ............... *G02B 6/35* (2013.01); *G02B 6/4271* (2013.01)

(58) Field of Classification Search
CPC .................................................... G02B 6/4271
See application file for complete search history.

(56) References Cited

U.S. PATENT DOCUMENTS

| 6,163,633 | A  | * | 12/2000 | Ueda .............................. 385/16 |
| 6,278,822 | B1 | * | 8/2001  | Dawnay .......................... 385/50 |
| 7,127,183 | B2 | * | 10/2006 | Oguma ............ H04B 10/07957 398/192 |
| 7,570,320 | B1 | * | 8/2009  | Anderson ............. G02F 1/1326 349/61 |
| 7,860,408 | B2 | * | 12/2010 | Isomura et al. ............... 398/212 |
| 2002/0181857 | A1 | * | 12/2002 | Komatsu .................. G02B 6/12 385/24 |
| 2002/0186730 | A1 | * | 12/2002 | Garbuzov ............ G02B 6/4204 372/36 |
| 2003/0012479 | A1 |   | 1/2003  | Kitou et al. |
| 2003/0090775 | A1 |   | 5/2003  | Webb et al. |
| 2007/0292075 | A1 |   | 12/2007 | Montgomery et al. |

(Continued)

FOREIGN PATENT DOCUMENTS

| CN | 1307691 A | 8/2001 | |
| JP | 2003215647 A | * 7/2003 | .............. G02F 1/313 |

(Continued)

OTHER PUBLICATIONS

Böttner, H., "Thermoelectric micro devices: current state, recent developments and future aspects for technological progress and applications," Twenty-First International Conference on Thermoelectrics, ICT Proceedings, Aug. 25-29, 2002, pp. 511-518.

(Continued)

*Primary Examiner* — Charlie Y Peng
(74) *Attorney, Agent, or Firm* — Slater & Matsil, L.L.P.

(57) ABSTRACT

Embodiments are provided for an apparatus and method for differential thermal optical switch control. The optical switch is operated based on the interferometric principle by modifying the optical phase between waves propagating in waveguides via refractive index change in the waveguides using the thermo-optic effect. A heat pump designed as part of the optical switch is used to generate a temperature difference across the waveguides based on the thermo-electric effect. The thermo-electric effect is obtained using thermo-electric material or elements, also referred to as Peltier elements. An embodiment apparatus includes a dielectric base, a pair of waveguides extended in parallel on the dielectric base, and on the dielectric base a thermo-electric material in contact with the pair of waveguides. Additionally, a pair of electrodes extended, on the thermo-electric material, next to and along the length of the waveguides.

20 Claims, 9 Drawing Sheets

(56) References Cited

U.S. PATENT DOCUMENTS

2008/0166098 A1* 7/2008 Ibe .................. G02B 6/4204
                                                 385/134
2010/0233837 A1* 9/2010 Chen et al. .................. 438/54

FOREIGN PATENT DOCUMENTS

JP          2009244624 A    10/2009
JP             4934625       5/2012

OTHER PUBLICATIONS

Da Silva, L., et al., "Micro-Thermoelectric Cooler: Interfacial Effects on Thermal and Electrical Transport," International Journal of Heat and Mass Transfer, vol. 47, May 2004, pp. 2417-2435.

Fleurial, J., et al., "Thermoelectric microcoolers for thermal management applications," XVI International Conference on Thermoelectrics, Aug. 26-29, 1997, pp. 641-645.

Goncalves, L., et al., "On-Chip Array of Thermoelectric Peltier Microcoolers," Solid-State Sensors, Actuators and Microsystems Conference, Jun. 10-14, 2007, pp. 2179-2182.

Harman, T., et al. "Quantum Dot Superlattice Thermoelectric Materials and Devices," Science, Sep. 27, 2002, pp. 2229-2232.

Snyder, G., et al., "Hot Spot Cooling Using Embedded Thermoelectric Coolers," Proc. 22nd IEEE Semi-Therm Symp., Mar. 2006, pp. 135-143.

Venkatasubramanian, R., et al., "Thin-Film Thermoelectric Devices with High Room-Temperature Figures of Merit," Nature International Weekly Journal of Science, vol. 413, Oct. 11, 2001, pp. 597-602.

Wijngaards, D., "Design and Fabrication of On-Chip Integrated PolySiGe and PolySi Peltier Devices," Sensors and Actuators, vol. 85, Aug. 25, 2000, pp. 316-323.

Wijngaards, D., "Thermo-Electric Characterization of APCVD PolySi0.7Ge0.3 for IC-Compatible Fabrication of Integrated Lateral Peltier Elements," IEEE Transactions on Electron Devices, vol. 52, No. 5, May 2005, pp. 1014-1025.

Von Arx, M., et al., "Test Structures to Measure the Seebeck Coefficient of CMOS IC Polysilicon," Semiconductor Manufacturing, IEEE Transactions, vol. 10, Issue 2, pp. 201-208, May 1997.

Doerr, C.R., et al., "16-Band Integrated Dynamic Gain Equalization Filter With Less Than 2.8-dB Insertion Loss," IEEE Photonics Technology Letters, vol. 14, No. 3, Mar. 2002, pp. 334-336.

Kasap, S., "Thermoelectric Effects in Metals: Thermocouples", An e-booklet (1997-Nov. 2001) 11 pages.

Syed, A., et al., "Flip Chip Bump Electromigration Reliability: A Comparison of Cu Pillar, High Pb, SnAg, and SnPb Bump Structures," IMAPS Device Packaging Conference, Mar. 2010, 6 pages.

Tsunashima, S., et al., "Silica-based, Compact and Variable-Optical-Attenuator Integrated Coherent Receiver With Stable Optoelectronic Coupling System," Optics Express, vol. 20, Issue 24, Nov. 2012, pp. 27174-27179.

International Search Report and Written Opinion received in International Application No. PCT/CN2014/092013 mailed Feb. 26, 2015, 16 Pages.

\* cited by examiner

APPARATUS AND METHOD FOR DIFFERENTIAL THERMAL OPTICAL SWITCH CONTROL

TECHNICAL FIELD

The present invention relates to the field of optical communications, and, in particular embodiments, to an apparatus and a method for differential thermal optical switch control.

BACKGROUND

Various photonic devices rely on optical interference (between multiple light paths) for modulating the amplitude, routing or switching of optical signals. Generally, this is achieved by splitting the optical signal equally between two waveguides and modifying the optical phase of one waveguide relative to the other. Devices based on this interferometric principle include optical switches for telecommunication wavelength bands such as the 1310 nm or 1550 nm bands. Optical phase modification is achieved by changing the refractive index in one or both of the paths.

The thermo-optic effect can be applied to change the refractive index in one of the paths by a local heating element, while the other path remains nominally at ambient temperature. The temperature difference created in this manner can produce the required optical phase difference between the two paths. However, maintaining the temperature difference in the optical switching element requires the consumption of electrical power, the level of which is determined by the electric current applied to achieve a desired state of the photonic switching element. As the desired state is changed to a different setting, the required temperature difference in the two waveguides needs to be adjusted by altering the thermal power and the electric current required to produce it. As the number of optical switch elements and complexity increases, more electrical power is required to drive the optical switch, leading to rise in thermal power dissipation and introducing cooling problems. Further, as the configuration of the optical switch changes during operation, temperature gradients across the switch elements can lead to thermal crosstalk between the elements, which could adversely affect switch operation and possibly require additional complexity in monitoring and controlling the switch elements. There is a need for an improved thermal optical switch control.

SUMMARY OF THE INVENTION

In accordance with an embodiment of the disclosure, an apparatus for an optical device based on differential thermal control comprises a dielectric base and a pair of waveguides extended in parallel on the dielectric base. The apparatus further comprises on the dielectric base, a thermo-electric material in contact with the pair of waveguides. The thermo-electric material is extended between the waveguides and along a length of the waveguides. Additionally, the apparatus comprises on the thermo-electric material a pair of electrodes extended next to the waveguides and along the length of the waveguides.

In accordance with another embodiment of the disclosure, an apparatus for an optical switch based on differential thermal control comprises a dielectric base, a pair of waveguides winding, into multiple parallel segments on the dielectric base, and, further on the dielectric base in each of the segments, a thermo-electric material in contact with the waveguides, wherein the thermo-electric material is extended between the waveguides and along a length of the segments. The apparatus further comprises on the thermo-electric material in each of the segments, a pair of electrodes extended next to and along the length of the segments.

In accordance with yet another embodiment of the disclosure, a method of differential thermal control for an optical device includes applying a voltage to a pair of electrodes across a thermo-electric material in contact with a pair of optical waveguides of the optical device. Applying the voltage to the electrodes provides a current flow and a heat flow through the thermo-electric material and across the optical waveguides. The method further includes adjusting the voltage across the electrodes according to an optical operation for the optical device. The adjustment of the voltage across the electrodes controls the current flow and heat flow between the optical waveguides.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for apparatuses and methods to achieve differential thermal optical switch control. The optical switch is operated based on the interferometric principle by modifying the optical phase between waves propagating in waveguides via refractive index change in the waveguides using the thermo-optic effect. Specifically, a heat pump designed as part of the optical switch is used to create the optical phase difference between two light paths in two waveguides. The heat pump generates a temperature difference across the waveguides based on the thermo-electric effect. The thermo-electric effect is obtained using thermo-electric material or elements, also referred to as Peltier elements.

The Peltier element is used to control heat flow via current flow control through this element. When an electric current is applied to flow from one end of the Peltier element to the other end, heat flows accordingly, either in the current flow direction or opposite to the current flow. Thus, one end of the Peltier element becomes cold or hot with respect to the other end. In other words, the Peltier element serves as a heat pump that pumps heat from one end to the other, causing a differential thermal effect across the two ends. The differential temperature is transferred from the Peltier element to an adjacent waveguide on one end of the Peltier element. The differential temperature is thus applied simultaneously between the waveguides. Specifically, the temperature is controlled simultaneously at both waveguides via a heat transfer from one waveguide to the other, as described in more details below. For example, applying an electric current into a suitable n-doped semiconductor material as the Peltier element, such as n-type silicon (Si) doped with Phosphorous, heat flows in the opposite direction of current flow. Alternatively, applying an electric current into a suitable p-doped semiconductor material, such as p-type Si doped with Boron, heat flows in the direction of current flow. N-type and p-type Gallium Arsenide (GaAs) or other semiconductors doped, for example, with Phosphorous, Indium, or Aluminum can also be used as Peltier elements.

Figure 1:
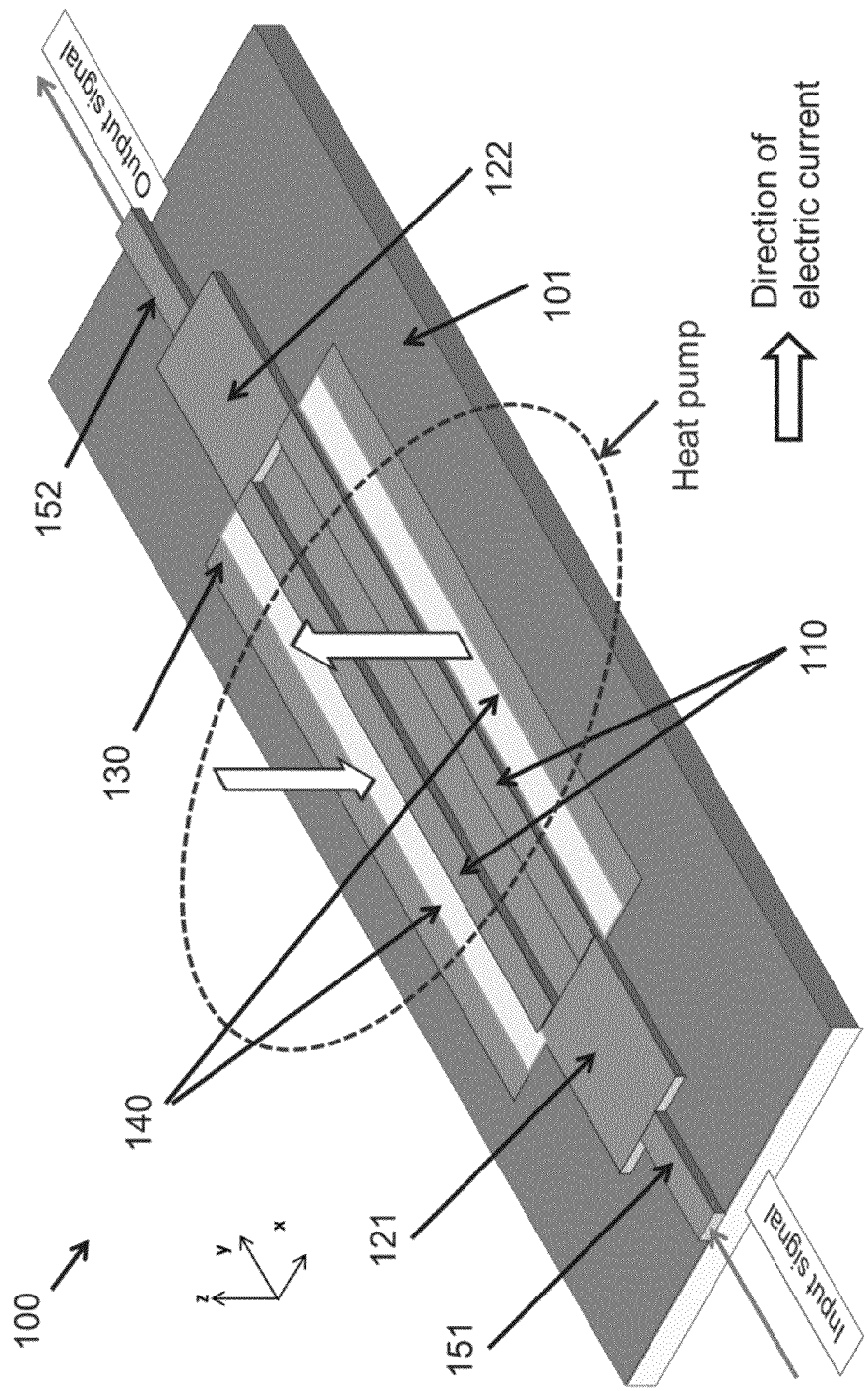
FIG. 1 illustrates an isometric top view of an embodiment of an optical switch operating using a differential thermal effect introduced by a Peltier element.

FIG. 1 shows a top view of an embodiment of an optical switch design 100 operating using the differential thermal effect introduced by a Peltier element. The optical switch design 100 includes two waveguides 110 that extend (in y direction) in parallel on a base 101. While it is practical to lay out the waveguides in parallel, other orientations may also be practical so long as the heat transfer between the waveguides is not impeded. The waveguides 110 are used to propagate two optical waves in corresponding paths of light along the length of the waveguides 110 from an input signal side to an output signal side (on opposite ends). The two waveguides 110 are coupled to a splitter 121 on the input signal side and to a coupler 122 on the output signal side (the opposite end). The splitter 121 and coupler 122 may be similar elements (of same shape and material) but differ in their functionality with regard to forwarding and manipulating light signals. Specifically, the splitter 121 is coupled to an input waveguide 151 on the end opposite to the two waveguides 110. The splitter 121 splits an input light signal incoming from the input waveguide 151 into two light paths of about equal power and directs each light signal into one of the two waveguides 110. On the other end of the waveguides 110, the coupler 122 couples the two incoming light signals from the two waveguides 110 into a combined output light signal and directs the output light signal into the output waveguide 152. The input signal and the output signal may be further processed by other elements of the optical switch (not shown). The components above describe a basic interferometer. Other embodiments may include (not exclusively) other components, for instance a splitter with two input waveguides, or a coupler with two output waveguides.

The splitter 121, coupler 122, input waveguide 151, and output waveguide 152 are also positioned on the base 101 and may have any suitable shape. The base 101 serves as an optical switch board that holds these elements as well as other elements of the optical switch. The splitter 121, coupler 122, input waveguide 151, and output waveguide 152 may be made from the same material as the waveguides 110. Examples of suitable waveguide material that can be used include Silicon Oxide ($SiO_2$), Silicon Nitride (SiN), and Silicon (Si). The thickness (in z direction) and width (in x direction) of these elements are designed to allow suitable propagation of optical light/waveguide modes. The base 101 is made using any suitable dielectric material preferably with a low coefficient of thermal conductivity such as $SiO_2$ or glass. The base 101 can have any suitable shape or geometry, for example a rectangular geometry as shown in FIG. 1.

The waveguides 110, splitter 121, coupler 122, input waveguide 151, and output waveguide 152 form a Mach-Zehnder (MZ) interferometer that introduces phase shifts between the two light signals as they travel about equal distances along the two branches of the interferometer (the two waveguides 110). The phase difference is controlled by changing the refractive indices of the waveguides 110 using the differential thermo-optic effect to achieve different optical switch operations, e.g., light signal amplitude modulation, routing, or switching. This is also referred to as differential thermal optical switch control. Specifically, a thermo-electric element 130, also referred to as a Peltier element, is positioned on top of the base 101 as a layer between the waveguides 110 and the bases 101. The Peltier layer or element 130 extends (in y direction) along a length of the two waveguides 110. Further, the Peltier element 130 is sufficiently long to permit an optical phase difference of at least 180 degrees to be induced, before reaching the two opposite ends of the waveguides 110 with the splitter 121 on one end and the coupler 122 on the other end, as shown in FIG. 1. The Peltier element 130 may be made from any suitable thermo-electric material, such as n-type Si, P-type Si or both. Additionally, an electrode element 140 is positioned next to one side (or both opposite sides) of each of the waveguides 110. The electrodes 140 extend (in y direction) along the entire length of the two waveguides 110 (in parallel) with the waveguides 110, on top and in contact with the Peltier layer or element 130, as shown in FIG. 1. In other embodiments, the electrodes 140 may have other designs and may be arranged or positioned in other suitable ways with respect to the other components. Although the electrodes 140 are shown along the length of the waveguides 110 next to the outer sides, the electrodes can be placed, alternatively or additionally, next to the inner sides of the waveguides 110 (on the Peltier layer or element 130), as described below. The electrodes 140 may be made from any suitable metal or conductive material, such as Aluminum (Al) or Copper (Cu).

The pair of electrodes 140 on both sides of the waveguides 110 are used to provide current through the Peltier element 130. The current flow direction (parallel to x direction) through the Peltier elements 130 for the two waveguides 110 causes a heat or thermal flow through the Peltier elements 130 and consequently between the two waveguides 110 which are in contact with the Peltier elements 130 and on opposite sides of the electrodes 140. The heat flow is opposite in the two Peltier elements elements 130 for the two waveguides 110. The arrows in FIG. 1 show one possible direction of the electric current, however the opposite direction is also possible, for example by reversing the voltage or changing the Peltier material. The thermal flow direction may be the same as or opposite to the current flow depending on the material of the Peltier element 130 (e.g., n-type or p-type semiconductor). Either way, a temperature difference is introduced between the two waveguides 110. This differential temperature across the waveguides 110 causes a refractive index differential between the two waveguides 110 and hence a phase shift or difference in the two light paths at the two waveguides 110. The Peltier element 130 and electrodes 140 are referred to as a heat pump due to this thermal flow effect.

Figure 2:
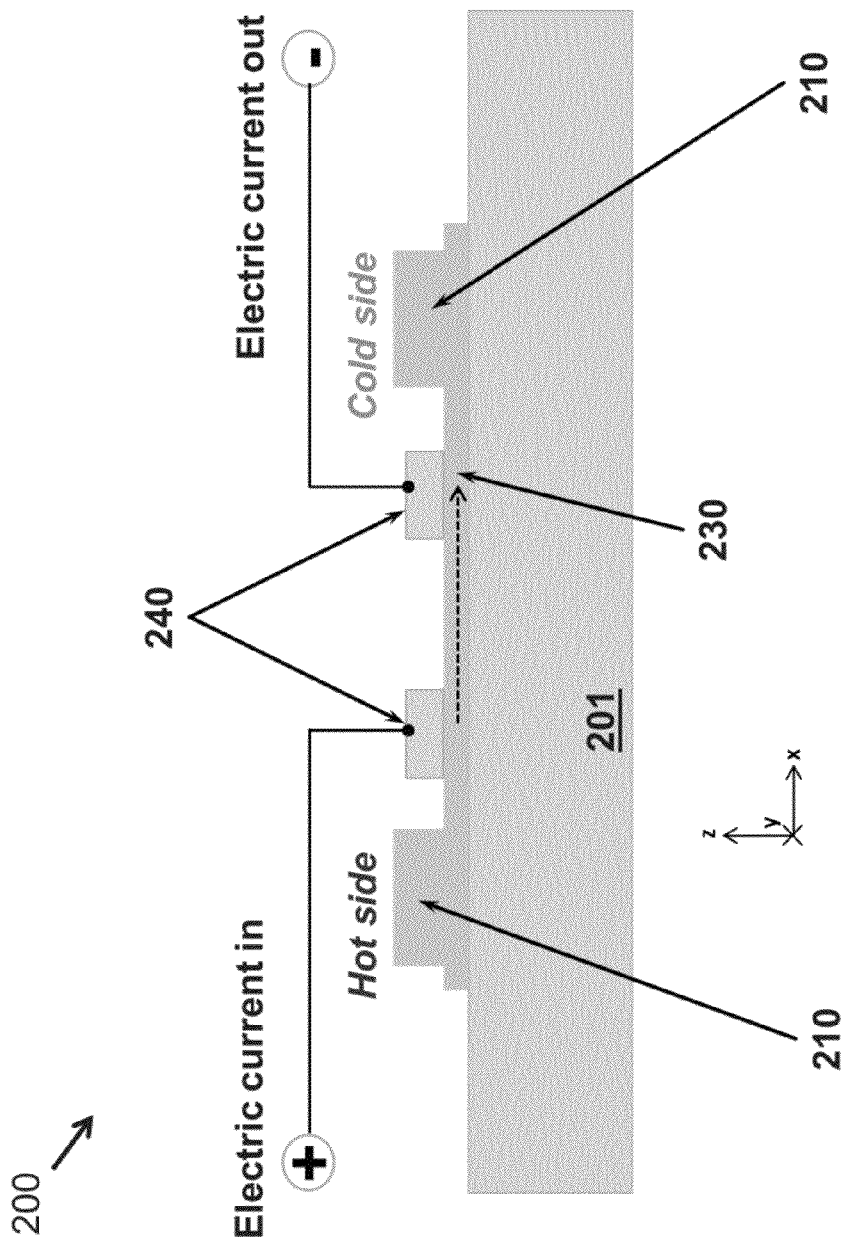
FIG. 2 illustrates a cross-sectional view of another embodiment of an optical switch operating using the differential thermal effect by a Peltier element.

FIG. 2 shows a side view of another embodiment of an optical switch design 200 operating using the differential thermal effect by a Peltier element. The optical switch design 200 includes two waveguides 210, a base 201, and a Peltier element/layer 230 positioned between the waveguides 210 and the base 201. The side view is a cross section view in the x-z plane perpendicular to the length (in y direction) of the pairs of waveguides 410. Additionally, two electrodes 240 are positioned on the Peltier element/layer 230, between the two waveguides 210, and close (within suitable distances) to the inner sides of the corresponding waveguides 210. Although not shown in this view, the Peltier element/layer 130 and the two electrodes 240 also extend along the length of the two waveguides 210 (in y direction). The elements in design 200 may be made of the same material of the corresponding elements in design 100. The arrows (in x direction) in FIG. 2 show one possible direction for the electric current (parallel to x direction), e.g., using n-type semiconductor Peltier material (heat flows in opposite direction of electric current). However, the opposite direction may also be achieved, for example by reversing the voltage or changing the Peltier material.

Figure 3:
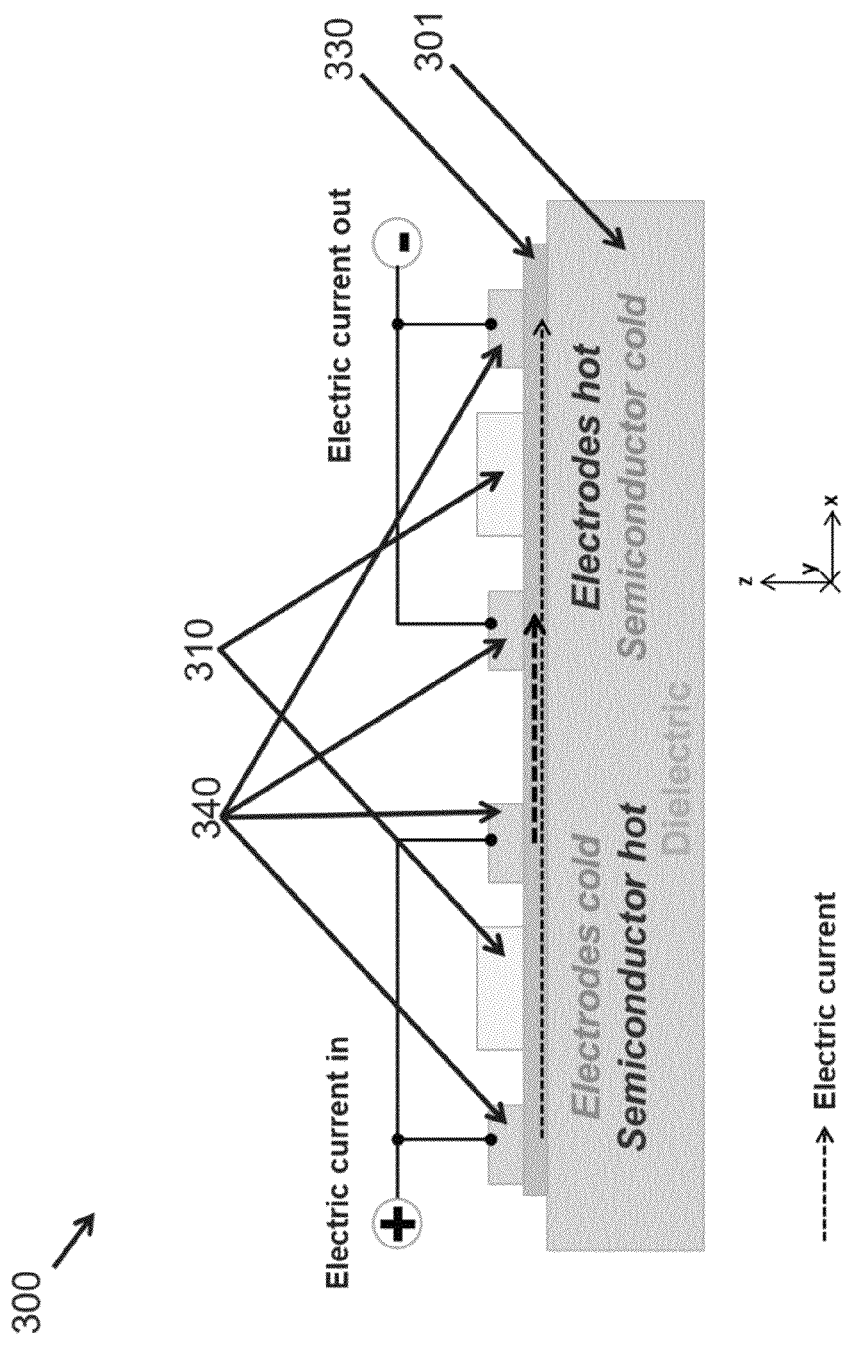
FIG. 3 illustrates a cross-sectional view of another embodiment of an optical switch operating using the differential thermal effect by a Peltier element.

FIG. 3 shows a side or cross section view of another embodiment of an optical switch design 300 operating using the differential thermal effect by a Peltier element. The optical switch design 300 includes two waveguides 310, a base 301, and a Peltier element/layer 330 positioned between the waveguides 310 and the base 301. Additionally, each waveguide 310 is positioned between a pair of electrodes 340 on the Peltier element/layer 330. For each waveguide 310, the two electrodes 340 are positioned close (within suitable distances) to the two opposite sides of the corresponding waveguide 310 along the length of the waveguides (parallel to y direction). Specifically, a first pair of electrodes 340 for a first waveguide 310 are jointly connected to the cathode, while a second pair of electrodes 340 for the second waveguide 310 are jointly coupled to the anode. Thus, the current and heat flow (in same or opposite direction) from one waveguide 310 to the other. The elements in design 300 may be made of the same material of the corresponding elements in design 100. The arrows in FIG. 3 show one possible direction for the electric current, e.g., using p-type semiconductor Peltier material (heat flows in the direction of electric current). However, the opposite direction is also possible, for example by reversing the voltage or changing the Peltier material.

Figure 4:
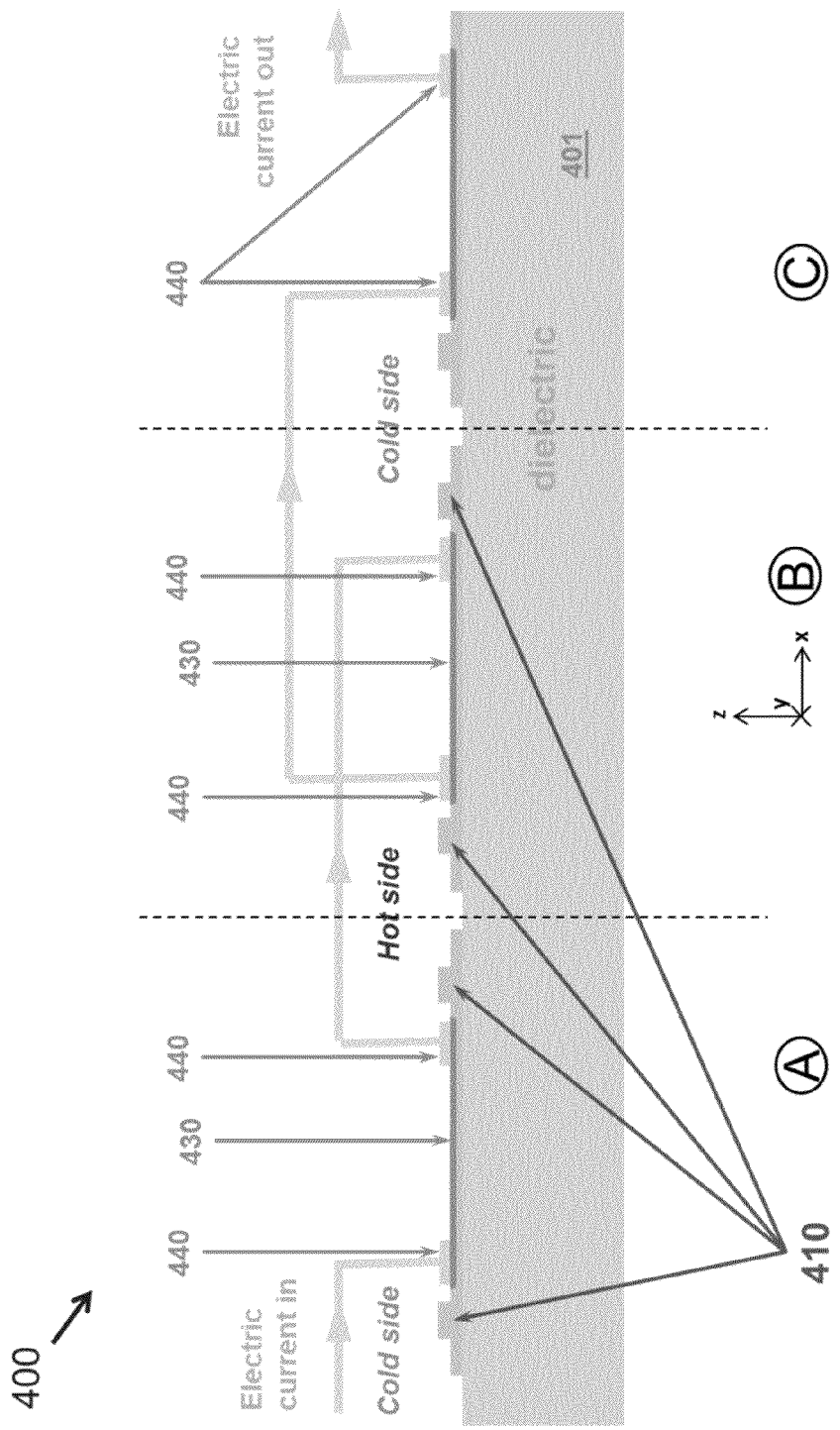
FIG. 4 illustrates a cross-sectional view of another embodiment of an optical switch operating using the differential thermal effect by Peltier elements.

FIG. 4 shows a side or cross section view of another embodiment of an optical switch design 400 operating using the differential thermal effect by Peltier elements. The optical switch design 400 includes a pair of waveguides 410 winding on itself multiple time a on a base 401, and a Peltier element/layer 430 on the base 401 in each segment of the winding pair. The Peltier element/layer 430 in each segment is positioned between the two waveguides 410. Each segment is aligned in parallel (parallel to y direction) with the other segments, as described in FIGS. 5A and 5B below. The cross section view of FIG. 4 is in the x-z plane perpendicular to the parallel segments of the pair of waveguides 410. The segments are connected in x direction. However, since the cross section is not along the connection lines of the segments, the segments appear to be disjoint. As an example, 3 segments are shown, separated by vertical dashed lines. Each of the segments includes both waveguides 410 and a Peltier element/layer 430. The Peltier element/layer 430 can be positioned on a thin layer (e.g., of Si or semiconductor) under the pairs of waveguides 410 and on top of the base 401. Further, since the pair of waveguides 410 is winding on itself multiple times forming parallel adjacent segments, the two adjacent waveguide sections in each two adjacent segments are part of the same waveguide of the two waveguides 410.

In each segment, two electrodes 440 are also positioned on the Peltier element/layer 430, between the two waveguides 410, and close (within suitable distances) to the inner edges of the corresponding waveguides 410. The electrodes 440 extend along the segment length (parallel to y direction). Specifically, in each pair of adjacent segments, a first electrode 440 in a first segment (e.g., segment A) is electrically connected to a second electrode 440 in the second segment of the pair (e.g., segment B). A first electrode 440 in the second segment (segment B) is electrically connected to a first electrode 440 in a third segment (e.g., segment C) adjacent to the pair. A first electrode 440 in the first segment (segment A) is electrically connected to a first electrode 440 in a fourth segment (not shown) adjacent to the pair of segments. Each two electrically connected electrodes 440 correspond to the two waveguides respectively, across the two adjacent segments. The connections between the electrodes 440 across segments provide differential temperature between the two waveguides across the segments, ensuring a hot waveguide and a corresponding cold waveguide and thus a phase difference between the two light paths. The solid line arrows in FIG. 4 show the connections between the electrodes 440 (of adjacent segments) and one possible direction of electric current flow, e.g., using n-type semiconductor Peltier material (heat flows in the opposite direction of electric current). However, the opposite direction is also possible, for example by reversing the voltage or changing the Peltier material. The elements in design 400 may be made of the same material of the corresponding elements in design 100.

Figure 5A:
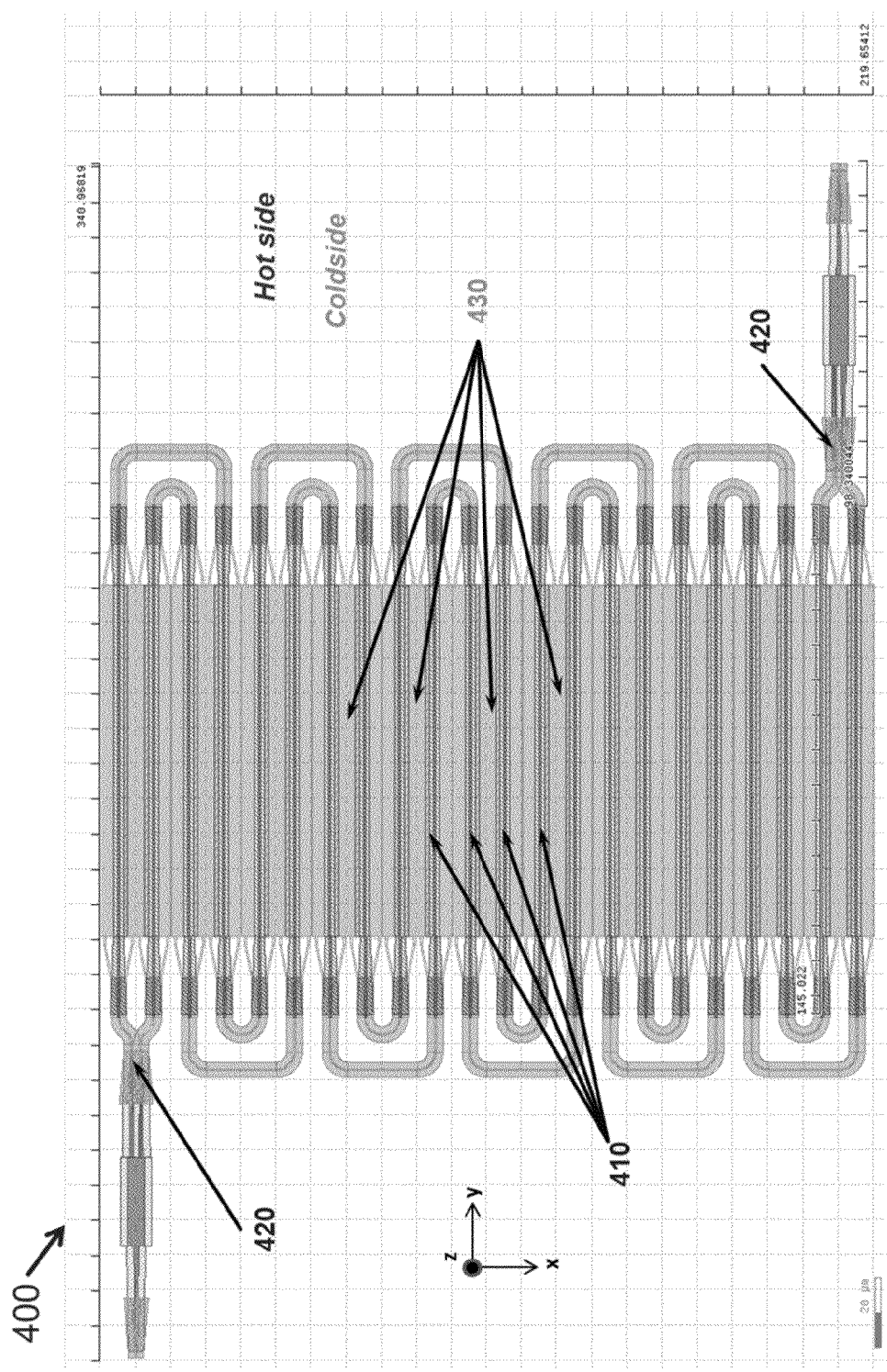
FIGS. 5A and 5B illustrate top views of the embodiment of FIG. 4.
Figure 5B:
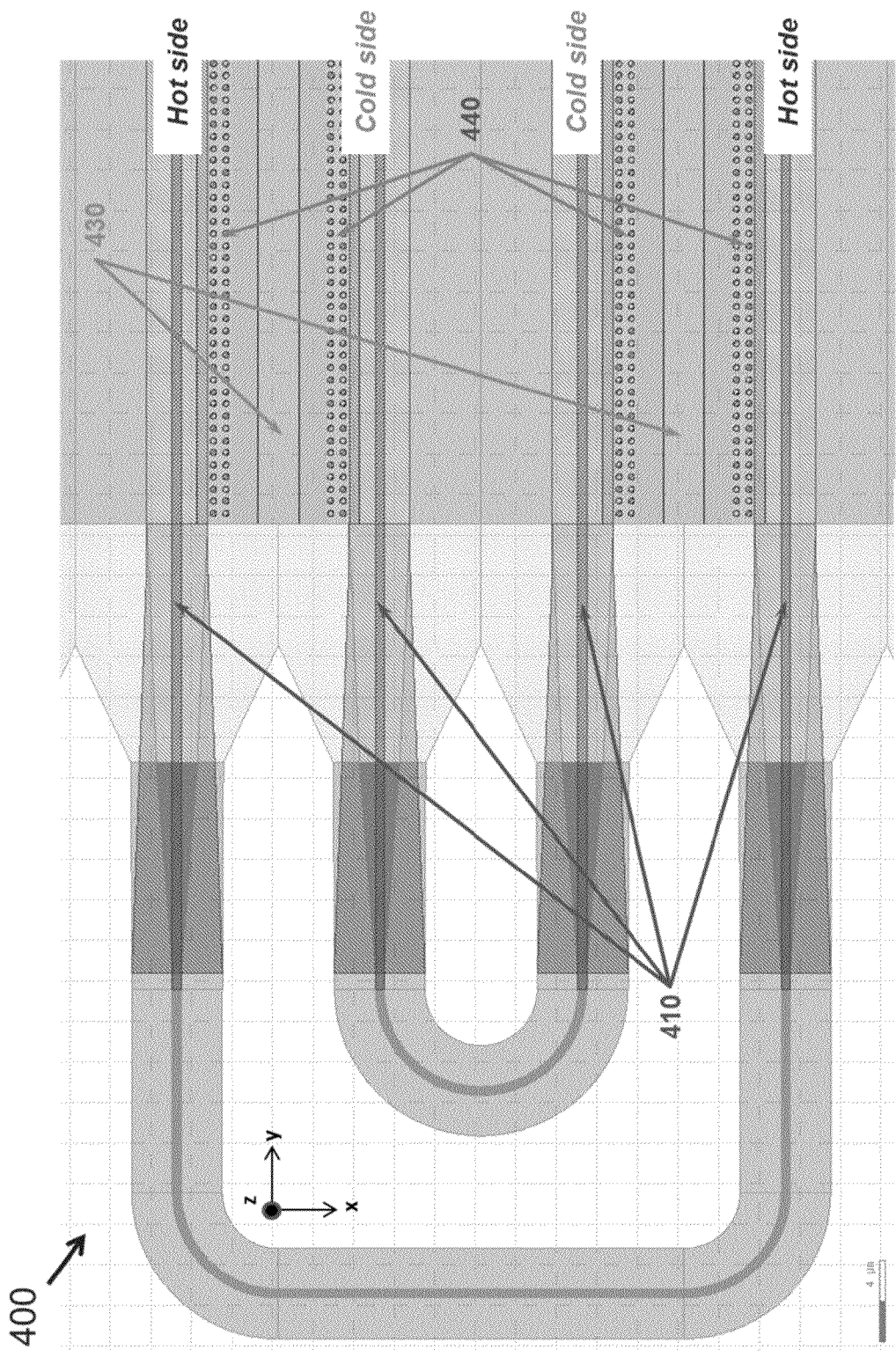

FIGS. 5A and 5B show top views of the optical switch design 400. The figures show the winding pair of waveguides 410. The waveguides 410 are winded into parallel segments extended in y direction, and connected in x direction. The waveguides 410 are shown in the x-y plane. The waveguides 410 are coupled at their two opposite ends to two corresponding couplers/splitters 420. The light signal can be forwarded, split into two paths, and recombined using the two couplers/splitters 420 in either direction. The Peltier elements 430 are also shown, between the two waveguides 410, in each segment. Each Peltier element 430 is used, as described above, to create the differential temperature effect between the two waveguides 410. FIG. 5A shows a scale of 20 micrometers (on left bottom corner). The length of each segment is chosen to be about 145 micrometers for this design. FIG. 5B shows a close up view of the design at a scale of 4 micrometers. FIG. 5B also shows the electrodes 440 close to the inner edges of the two waveguides 410, in each segment. Although the electrodes 440 are shown as 2-dimensional arrays of metal bumps, other embodiments may use continuous layers or strips of metal for forming the electrodes 440.

Figure 6:
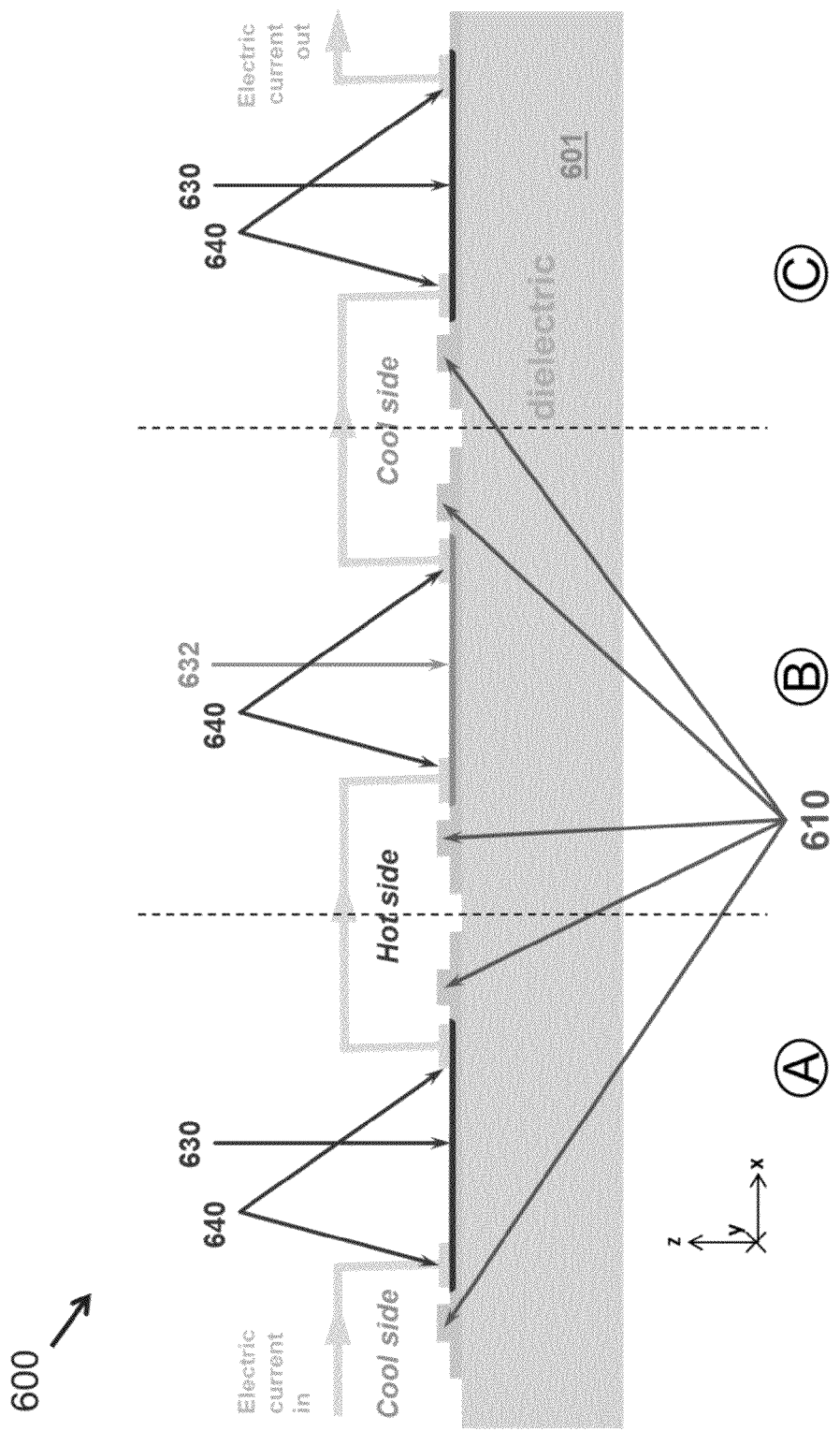
FIG. 6 illustrates a cross-sectional view of another embodiment of an optical switch operating using the differential thermal effect by Peltier elements.

FIG. 6 shows a side or cross section view of another embodiment of an optical switch design 600 operating using the differential thermal effect by Peltier elements. The optical switch design 600 includes a pair of waveguides 610 winding on itself multiple times on a base 601, and an alternating sequence of Peltier elements/layers 630 and 632 on the base 601 in the consecutive segments of the winding pair. The Peltier elements/layers 630 and 632 are of different doping type material (e.g., p-type and n-type Si). The Peltier elements 630 and 632 in each segment are positioned between the two waveguides 610. The cross section view of FIG. 6 is in the x-z plane perpendicular to the parallel segments of the pair of waveguides 610. The segments are connected in x direction. However, since the cross section view is not along the connection lines of the segments, the segments appear to be disjoint. As an example, 3 segments are shown, separated by vertical dashed lines. Each of the segments includes both waveguides 610 and a Peltier element/layer 630 or 632. The Peltier element/layer 630 and 632 can be positioned on a thin layer (e.g., of Si or semiconductor) under the pairs of waveguides 610 and on top of the base 601.

In each segment, two electrodes 640 are also positioned on the Peltier element/layer 630 or 632, between the two waveguides 610, and close (within suitable distances) to the inner edges of the corresponding waveguides 610. The electrodes 640 extend along the segment length (parallel to y direction). Specifically, for each two adjacent segments, a first electrode 640 in a first segment (e.g., segment A) of the pair is electrically connected to a second electrode 640 in the second segment of the pair (e.g., segment B). The first electrode 640 in the first segment (segment A) and the second electrode 640 in the second adjacent segment (segment B) are on opposite edges of the same waveguides 610, across the two adjacent segments. A first electrode 640 in the second segment (segment B) is electrically connected to a second electrode 640 in a third segment (e.g., segment C) adjacent to the first segment (segment B). A second electrode 640 in the first segment (segment A) is electrically connected to first electrode 640 in a fourth segment (not shown). Thus, each two electrically connected electrodes 640 correspond to the same waveguide 610 in two adjacent segments. The connections between the electrodes 640 across segments provide differential temperature between the two waveguides across the segments, ensuring a hot waveguide and a corresponding cold waveguide and thus a phase difference between the two light paths.

The solid line arrows in FIG. 6 show the connections between the electrodes 640 (of adjacent segments) and one possible direction for the electric current, e.g., for a chosen alternating sequence of n-type and p-type semiconductor Peltier material. However, the opposite direction is also possible, for example by reversing the voltage or the alternating sequence of n-type and p-type Peltier material. The elements in design 600 may be made of the same material of the corresponding elements in design 100. In the design 600, using an alternating sequence of n-type and p-type semiconductor material as Peltier elements simplifies the joint connections of electrodes across the segments of the winding pair of waveguides, e.g., in comparison to the design 100.

Figure 7:
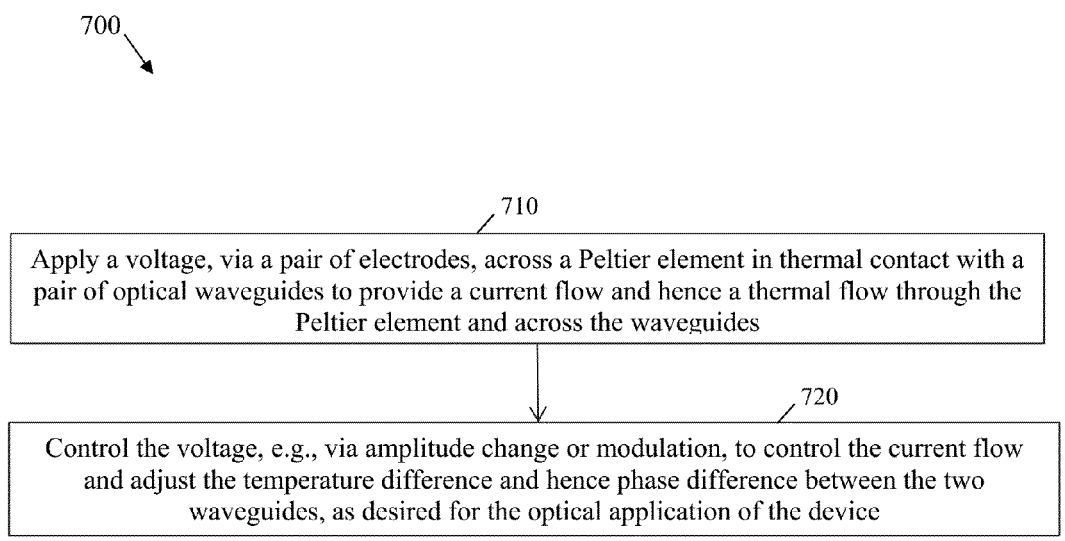
FIG. 7 illustrates an embodiment of a method of operation of an optical switch operating using the differential thermal effect by Peltier elements.

FIG. 7 shows an embodiment of a method 700 for operating an optical switch using the differential thermal effect by Peltier elements. The method 700 can be used to operate any of the optical switch designs above or similar designs that use Peltier elements as heat pumps in a Mach-Zehnder interferometer waveguide device. At step 710, a voltage is applied, via a pair of electrodes, across a Peltier element in contact with a pair of optical waveguides to provide a current flow and hence a heat flow through the Peltier element and across the waveguides. At step 720, the voltage is controlled, e.g., via amplitude change or modulation, to control the current flow and adjust the temperature difference and hence phase difference between the two waveguides, as desired for the optical application of the device.

Figure 8:
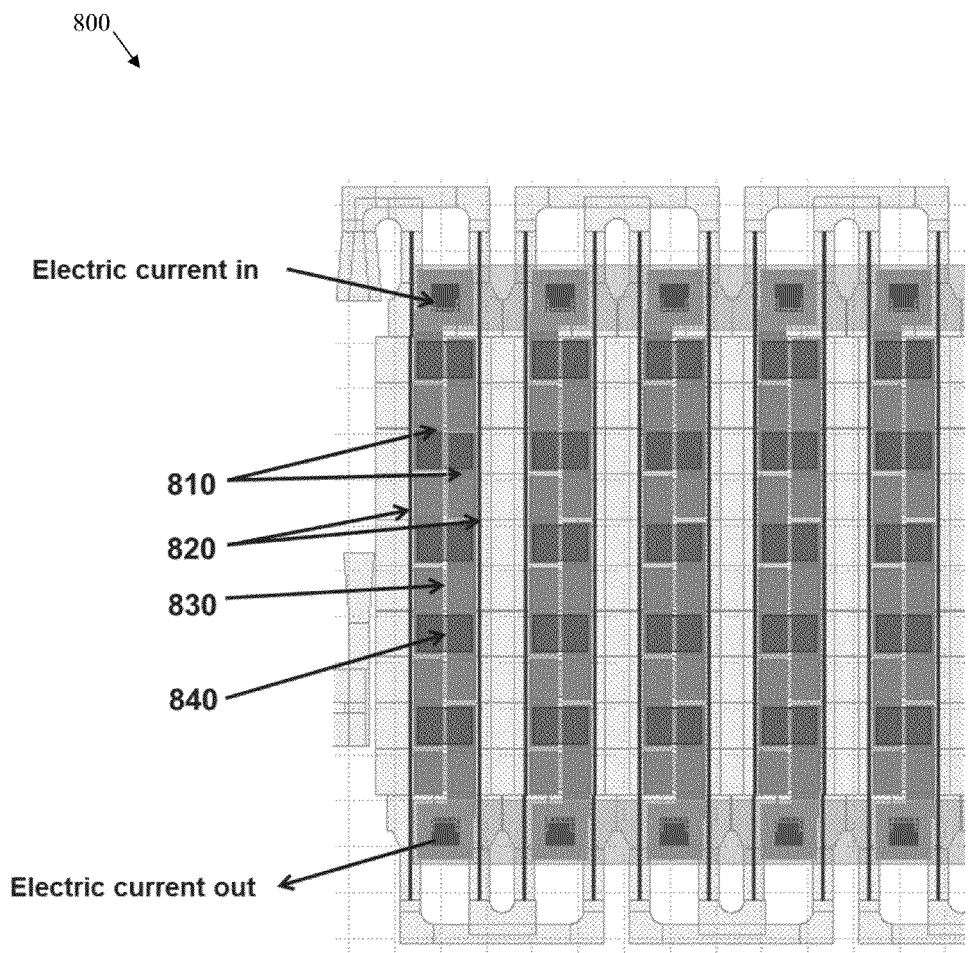
FIG. 8 illustrates a top view of another embodiment of an optical switch operating using the differential thermal effect by Peltier elements.

FIG. 8 shows a top view of another embodiment of an optical switch design 800 operating using the differential thermal effect by Peltier elements. The optical switch design 800 comprises a MZ switch with a segmented Peltier thermo-optic phase shifter. The design 800 can include multiple pairs of waveguides for multiple MZ switches. Each switch includes a pair of parallel optical waveguides 820, e.g., composed of Si, SiO$_2$, SiN or other suitable material. Two alternating types of Peltier elements: n-type thermo-electric 830 elements and p-type thermo-electric elements 840 (e.g., of n-type Si and p-type Si) are positioned between and along the length of the two waveguides 820. Additionally, the design 800 includes staggered metal electrodes 810 (e.g., of Al, Cu, or other suitable metal) that serve as alternating connections between the n-type and p-type Peltier elements. At each waveguide pair (or switch), the electrodes are coupled to an electric input and an electric output at the opposite edges of the waveguides 820 as shown in FIG. 8.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for an optical device based on differential thermal control, the apparatus comprising:
   a dielectric base;
   a pair of waveguides on the dielectric base, the waveguides having substantially similar lengths and extending in parallel for their lengths;
   on the dielectric base, a single continuous layer of a thermo-electric material in contact with the pair of waveguides, wherein the continuous layer of the thermo-electric material is extended at least between outer sides of the waveguides across both waveguides, and along the length of the waveguides; and
   on the thermo-electric material, a pair of electrodes extended next to the waveguides and along the length of the waveguides.

2. The apparatus of claim 1 further comprising:
   a splitter coupled to a first end of the waveguides;
   an input signal waveguide coupled to the splitter on an opposite end of the splitter from the waveguides;
   a coupler coupled to a second end of the waveguides; and an output signal waveguide coupled to the coupler on an opposite end of the coupler from the waveguides.

3. The apparatus of claim 1, wherein the thermo-electric material is a semiconductor layer between the dielectric base and the waveguides.

4. The apparatus of claim 1, wherein the electrodes are extended between the waveguides and next to inner edges of the waveguides.

5. The apparatus of claim 4 further comprising, on the thermo-electric material, a pair of second electrodes extended next to the waveguides and along the length of the waveguides, wherein the second electrodes are next to outer edges of the waveguides.

6. The apparatus of claim 1, wherein the electrodes are next to outer edges of the waveguides.

7. The apparatus of claim 1, wherein the waveguides are composed of Silicon Oxide ($SiO_2$), Silicon Nitride (SiN), or Silicon (Si).

8. The apparatus of claim 1, wherein the dielectric base is composed of Silicon Oxide ($SiO_2$) or glass.

9. The apparatus of claim 1, wherein the thermo-electric material is a n-type or p-type doped Silicon.

10. An apparatus for an optical switch based on differential thermal control, the apparatus comprising:
a dielectric base;
on the dielectric base, a pair of waveguides winding, into multiple parallel segments, each of the multiple parallel segments having substantially similar lengths;
on the dielectric base in each of the segments, a single continuous layer of a thermo-electric material in contact with the waveguides, wherein the continuous layer of the thermo-electric material is extended at least between outer sides of the waveguides across both waveguides, and along the length of the multiple parallel segments; and
on the thermo-electric material in each of the segments, a pair of electrodes extended next to and along the length of the multiple parallel segments.

11. The apparatus of claim 10 further comprising a semiconductor layer between waveguides and the dielectric base, wherein the thermo-electric material in each of the segments is an n-type or p-type doped semiconductor on the semiconductor layer.

12. The apparatus of claim 10, wherein the electrodes in each of the segments are between the waveguides and next to inner edges of the waveguides.

13. The apparatus of claim 10, wherein a first electrode in a first segment and a second electrode in a second segment adjacent to the first segment are electrically connected.

14. The apparatus of claim 13, wherein the first electrode in the first segment is next to a first waveguide, and wherein the second electrode in the second segment is next to a second waveguide.

15. The apparatus of claim 14, wherein the thermo-electric material in each of the segments is composed of a same n-type or p-type doped semiconductor.

16. The apparatus of claim 13, wherein both the first electrode in the first segment and the second electrode in the second segment are next to a same waveguide.

17. The apparatus of claim 16, wherein the thermo-electric material in each next segment of the segments alternate between n-type and p-type doped semiconductor.

18. A method of differential thermal control for an optical device, the method comprising:
applying a voltage to a pair of electrodes across a single continuous layer of a thermo-electric material in contact with a pair of optical waveguides of the optical device, the thermo-electric material extending at least between outer sides of the waveguides across both waveguides; wherein applying the voltage to the electrodes provides a current flow and a heat flow through the continuous layer of the thermo-electric material and across the optical waveguides; and
adjusting the voltage across the electrodes according to an optical operation for the optical device, wherein adjusting the voltage across the electrodes controls the current flow and heat flow between the optical waveguides.

19. The method of claim 18, wherein adjusting the voltage according to the optical operation for the optical device comprises changing amplitude of or modulating the voltage, and wherein the optical operation is one of amplitude modulation, routing, or switching of optical signals.

20. The method of claim 18, wherein controlling the current flow and heat flow between the optical waveguides provides simultaneous temperature change between the optical waveguides.

* * * * *